US009600495B2

(12) United States Patent
Koike

(10) Patent No.: US 9,600,495 B2
(45) Date of Patent: Mar. 21, 2017

(54) IMAGE SEARCH SYSTEM, IMAGE SEARCH METHOD, IMAGE SEARCH DEVICE, PROGRAM, AND INFORMATION RECORDING MEDIUM

(75) Inventor: Hiroyuki Koike, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 197 days.

(21) Appl. No.: 14/369,205

(22) PCT Filed: Dec. 29, 2011

(86) PCT No.: PCT/JP2011/080535
§ 371 (c)(1),
(2), (4) Date: Aug. 7, 2014

(87) PCT Pub. No.: WO2013/099038
PCT Pub. Date: Jul. 4, 2013

(65) Prior Publication Data
US 2014/0369610 A1  Dec. 18, 2014

(51) Int. Cl.
*G06K 9/00* (2006.01)
*G06K 9/46* (2006.01)
(Continued)

(52) U.S. Cl.
CPC .... *G06F 17/30247* (2013.01); *G06F 17/3025* (2013.01); *G06F 17/30259* (2013.01); *G06F 17/30277* (2013.01); *G06K 9/6202* (2013.01)

(58) Field of Classification Search
USPC .......................................... 382/219, 111, 190
See application file for complete search history.

(56) References Cited

U.S. PATENT DOCUMENTS 6,002,798 A * 12/1999 Palmer .............. G06F 17/30616
  382/176
6,101,000 A *  8/2000 Murray ................ G03D 15/005
  358/1.9
(Continued)

FOREIGN PATENT DOCUMENTS

JP   11-212990 A   8/1999
JP   2000-163576 A   6/2000
(Continued)

OTHER PUBLICATIONS

The partial translation of Office Action for corresponding Japanese Patent Application No. 2013-551170 dated Aug. 26, 2014.
(Continued)

*Primary Examiner* — Kathleen Y Dulaney
(74) *Attorney, Agent, or Firm* — Hubbs, Enatsky & Inoue PLLC

(57) ABSTRACT

Provided is an image search system capable of searching for an image that differs in a specific part from an original image. A reception unit receives designation of a partial region in an original image to be processed and a process content for the partial region. A search unit searches for an image identical or similar to a processed image, which is obtained by applying a process of the process content to the partial region of the original image, based on: a plurality of kinds of feature information on a region other than the partial region of the processed image or of the original image; and at least one piece of feature information selected based on the process content from among a plurality of kinds of feature information on the partial region of the processed image or of the original image.

7 Claims, 8 Drawing Sheets

(51) Int. Cl.
 *G06K 9/48* (2006.01)
 *G06F 17/30* (2006.01)
 *G06K 9/62* (2006.01)

(56) References Cited

U.S. PATENT DOCUMENTS

| | | | | |
|---|---|---|---|---|
| 8,339,619 | B2* | 12/2012 | Misawa | G06K 9/00442 358/1.13 |
| 2004/0042663 | A1* | 3/2004 | Yamada | G06K 9/00711 382/217 |
| 2004/0114189 | A1* | 6/2004 | Kaku | G06T 5/008 358/3.26 |
| 2006/0039586 | A1* | 2/2006 | Takematsu | G06F 17/30038 382/115 |
| 2006/0104512 | A1* | 5/2006 | Hayashi | G06F 17/30253 382/176 |
| 2007/0140568 | A1* | 6/2007 | Kohtani | G06F 17/30253 382/229 |
| 2008/0240572 | A1* | 10/2008 | Hoshii | G06F 17/30256 382/190 |
| 2009/0202179 | A1* | 8/2009 | Shivanna | G06F 19/321 382/311 |
| 2009/0268959 | A1* | 10/2009 | Harada | G06T 7/001 382/149 |
| 2010/0158375 | A1* | 6/2010 | Okamoto | G06K 9/00483 382/173 |
| 2010/0202015 | A1* | 8/2010 | Misawa | G06F 17/30253 358/1.15 |
| 2011/0058736 | A1* | 3/2011 | Tokunaga | G06T 11/00 382/165 |
| 2011/0311148 | A1* | 12/2011 | Ranguelova | G06K 9/6211 382/209 |

FOREIGN PATENT DOCUMENTS

| | | |
|---|---|---|
| JP | 2006-155588 A | 6/2006 |
| JP | 2011-138420 A | 7/2011 |
| WO | 2007/101114 A2 | 9/2007 |

OTHER PUBLICATIONS

Tsutomu Horikoshi et al., "3D Modeling Using Rough Sketches and 3D Shape Retrieval System", Transactions of Information Processing Society of Japan, Sep. 15, 1994, vol. 35, No. 9, pp. 1750 to 1758. Cited in English translation of ISR.

International Search Report for PCT/JP2011/080535 dated Feb. 7, 2012.

* cited by examiner

|     | PROCESS CONTENT FOR PROCESSED REGION | | | | | FEATURE INFORMATION ON PROCESSED REGION TO BE USED FOR IMAGE SEARCH | | |
|-----|--------|--------|--------|--------|-----------------|--------|---------|-------|
|     | COLOR | | PATTERN | | CHANGE OF SHAPE | COLOR | PATTERN | SHAPE |
|     | REMOVE | CHANGE | REMOVE | CHANGE | | | | |
| (A) | ○ | | | | | | ○ | ○ |
| (B) | ○ | | | | ○ | | ○ | ○ |
| (C) | | | ○ | | | ○ | | ○ |
| (D) | | | ○ | | ○ | ○ | | ○ |
| (E) | ○ | | ○ | | | | | ○ |
| (F) | ○ | | ○ | | ○ | | | ○ |
| (G) | | ○ | | | | ○ | ○ | ○ |
| (H) | | | | ○ | | ○ | ○ | ○ |
| (I) | | | | | ○ | ○ | ○ | ○ |
| (J) | | ○ | ○ | | | ○ | ○ | ○ |
| (K) | | ○ | | | ○ | ○ | ○ | ○ |
| (L) | | | ○ | | ○ | ○ | ○ | ○ |
| (M) | | ○ | | ○ | ○ | ○ | ○ | ○ |

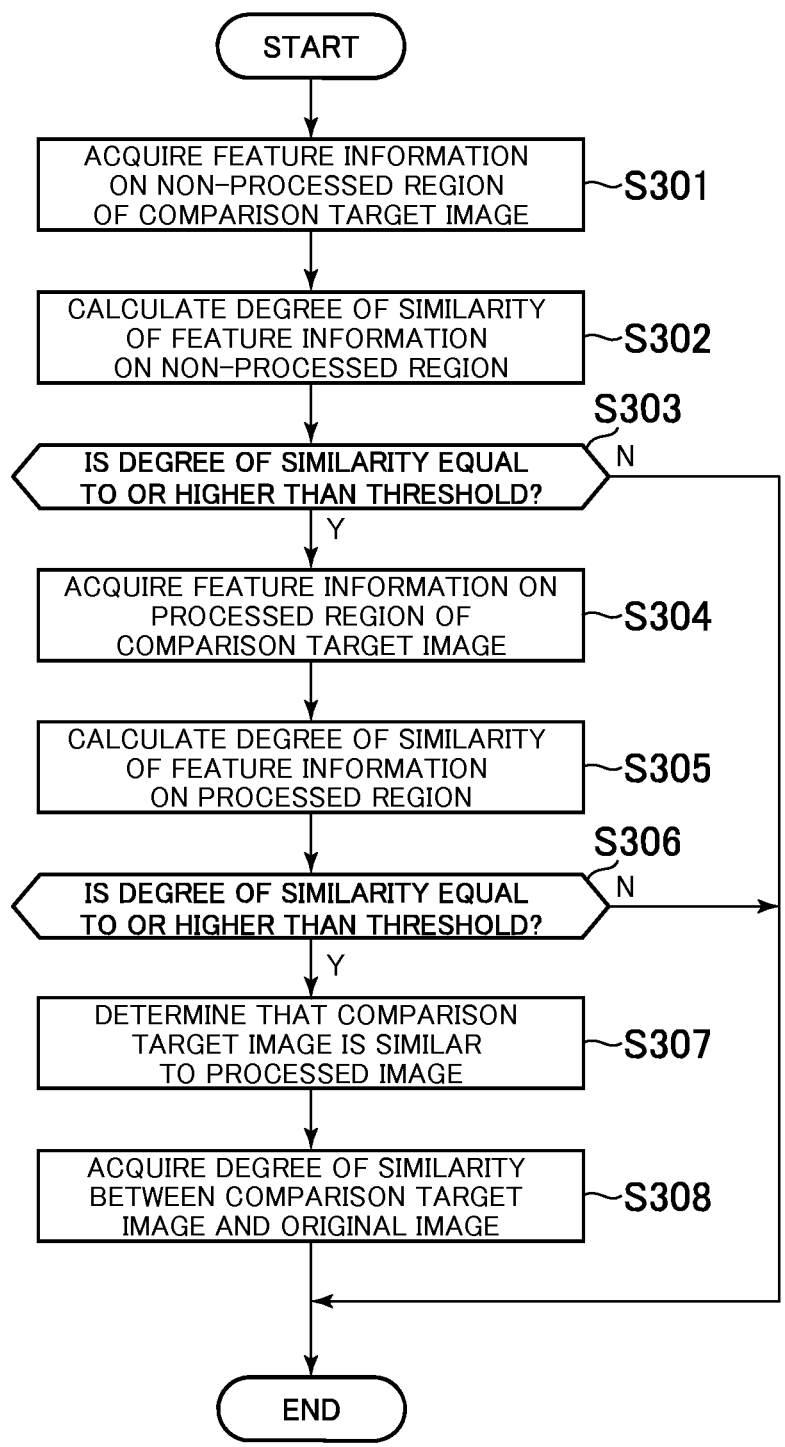

IMAGE SEARCH SYSTEM, IMAGE SEARCH METHOD, IMAGE SEARCH DEVICE, PROGRAM, AND INFORMATION RECORDING MEDIUM

CROSS REFERENCE TO RELATED APPLICATIONS

This application is a National Stage of International Application No. PCT/JP2011/080535 filed Dec. 29, 2011, the content of which is incorporated herein by reference in its entirety.

TECHNICAL FIELD

The present invention relates to an image search system, an image search method, an image search device, a program, and an information storage medium.

BACKGROUND ART

An image search system for searching for an image similar to an original image is known (see, for example, Patent Literature 1). For example, an image search system for searching for a clothing image similar to a clothing image is known.

CITATION LIST

Patent Literature

[Patent Literature 1] JP 2011-138420 A

SUMMARY OF INVENTION

Technical Problem

In the related-art image search system, it has been difficult to search for an image that differs in a specific part from an original image. For example, in an image search based on a clothing image (original image), it has been difficult to search for a clothing image that differs only in a pattern (design) of a sleeve part from the original image.

The present invention has been made in view of the above-mentioned problem, and it is an object thereof to provide an image search system, an image search method, an image search device, a program, and an information storage medium capable of searching for an image that differs in a specific part from an original image.

Solution to Problem

In order to solve the above-mentioned problem, an image search system according to one embodiment of the present invention is an image search system, including: original image acquisition means for acquiring an original image; reception means for receiving designation of a partial region in the original image to be processed and a process content for the partial region; search means for executing an image search based on: a plurality of kinds of feature information on a region other than the partial region of a processed image or of the original image, the processed image being obtained by applying a process of the process content to the partial region of the original image; and at least one piece of feature information selected based on the process content from among a plurality of kinds of feature information on the partial region of the processed image or of the original image; and output control means for causing output means to output a search result of the search means.

Further, an image search method according to one embodiment of the present invention is an image search method, including: an original image acquisition step of acquiring an original image; a reception step of receiving designation of a partial region in the original image to be processed and a process content for the partial region; a search step of executing an image search based on: a plurality of kinds of feature information on a region other than the partial region of a processed image or of the original image, the processed image being obtained by applying a process of the process content to the partial region of the original image; and at least one piece of feature information selected based on the process content from among a plurality of kinds of feature information on the partial region of the processed image; and an output control step of causing output means to output a search result of the search means.

Further, an image search device according to one embodiment of the present invention is an image search device, including: means for acquiring a process content for a partial region of an original image; and search condition setting means for setting a search condition for an image search based on: a plurality of kinds of feature information on a region other than the partial region of a processed image or of the original image, the processed image being obtained by applying a process of the process content to the partial region of the original image; and at least one piece of feature information selected based on the process content from among a plurality of kinds of feature information on the partial region of the processed image or of the original image.

Further, a program according to one embodiment of the present invention is a program for causing a computer to function as: means for acquiring a process content for a partial region of an original image; and search condition setting means for setting a search condition for an image search based on: a plurality of kinds of feature information on a region other than the partial region of a processed image, the processed image being obtained by applying a process of the process content to the partial region of the original image; and at least one piece of feature information selected based on the process content from among a plurality of kinds of feature information on the partial region of the processed image.

Further, a computer readable information storage medium according to one embodiment of the present invention is a computer readable information storage medium storing a program for causing a computer to function as: means for acquiring a process content for a partial region of an original image; and search condition setting means for setting a search condition for an image search based on: a plurality of kinds of feature information on a region other than the partial region of a processed image, the processed image being obtained by applying a process of the process content to the partial region of the original image; and at least one piece of feature information selected based on the process content from among a plurality of kinds of feature information on the partial region of the processed image.

Further, in one embodiment of the present invention, in a case where the original image is included in the search result of the search means, the output control means may prevent the output means from outputting the original image as the search result of the search means.

Further, in one embodiment of the present invention, the output control means may include: output order setting means for setting an output order of each of images searched for by the search means based on a degree of similarity between each of the images searched for by the search means and the original image; and means for causing the output means to output the images searched for by the search means in accordance with the output order of each of the images searched for by the search means. The output order setting means may set an output order of an image having a low degree of similarity with the original image to be higher than an output order of an image having a high degree of similarity with the original image.

Further, in one embodiment of the present invention, the search means may include determination means for determining whether or not a target image is an identical or similar image to the processed image, and may search for an image identical or similar to the processed image. The determination means may include: means for determining whether or not a first degree of similarity is equal to or higher than a first reference degree of similarity, the first degree of similarity indicating a degree of similarity between the plurality of kinds of feature information on the region other than the partial region of the processed image or of the original image and the plurality of kinds of feature information on a region of the target image corresponding to the region other than the partial region of the processed image; and means for determining whether or not a second degree of similarity is equal to or higher than a second reference degree of similarity lower than the first reference degree of similarity, the second degree of similarity indicating a degree of similarity between the at least one piece of feature information on the partial region of the processed image and the at least one piece of feature information on a region of the target image corresponding to the partial region of the processed image. The determination means may determine that the target image is an identical or similar image to the processed image in a case where it is determined that the first degree of similarity is equal to or higher than the first reference degree of similarity and it is determined that the second degree of similarity is equal to or higher than the second reference degree of similarity.

Further, in one embodiment of the present invention, the search means may include determination means for determining whether or not a target image is a similar image to the original image, and may search for an image similar to the original image. The determination means may include: means for determining whether or not a first degree of similarity is equal to or higher than a first reference degree of similarity, the first degree of similarity indicating a degree of similarity between the plurality of kinds of feature information on the region other than the partial region of the original image and the plurality of kinds of feature information on a region of the target image corresponding to the region other than the partial region of the original image; and means for determining whether or not a second degree of similarity is equal to or higher than a second reference degree of similarity lower than the first reference degree of similarity, the second degree of similarity indicating a degree of similarity between the at least one piece of feature information on the partial region of the original image and the at least one piece of feature information on a region of the target image corresponding to the partial region of the original image. The determination means may determine that the target image is a similar image to the original image in a case where it is determined that the first degree of similarity is equal to or higher than the first reference degree of similarity and it is determined that the second degree of similarity is equal to or higher than the second reference degree of similarity.

Advantageous Effect of Invention

According to one embodiment of the present invention, it is possible to search for an image that differs in a specific part from an original image.

BRIEF DESCRIPTION OF DRAWINGS

FIG. 12 is a flowchart illustrating example of processing executed by the image search system.

DESCRIPTION OF EMBODIMENTS

Now, an exemplary embodiment of the present invention is described in detail with reference to the accompanying drawings.

Figure 1:
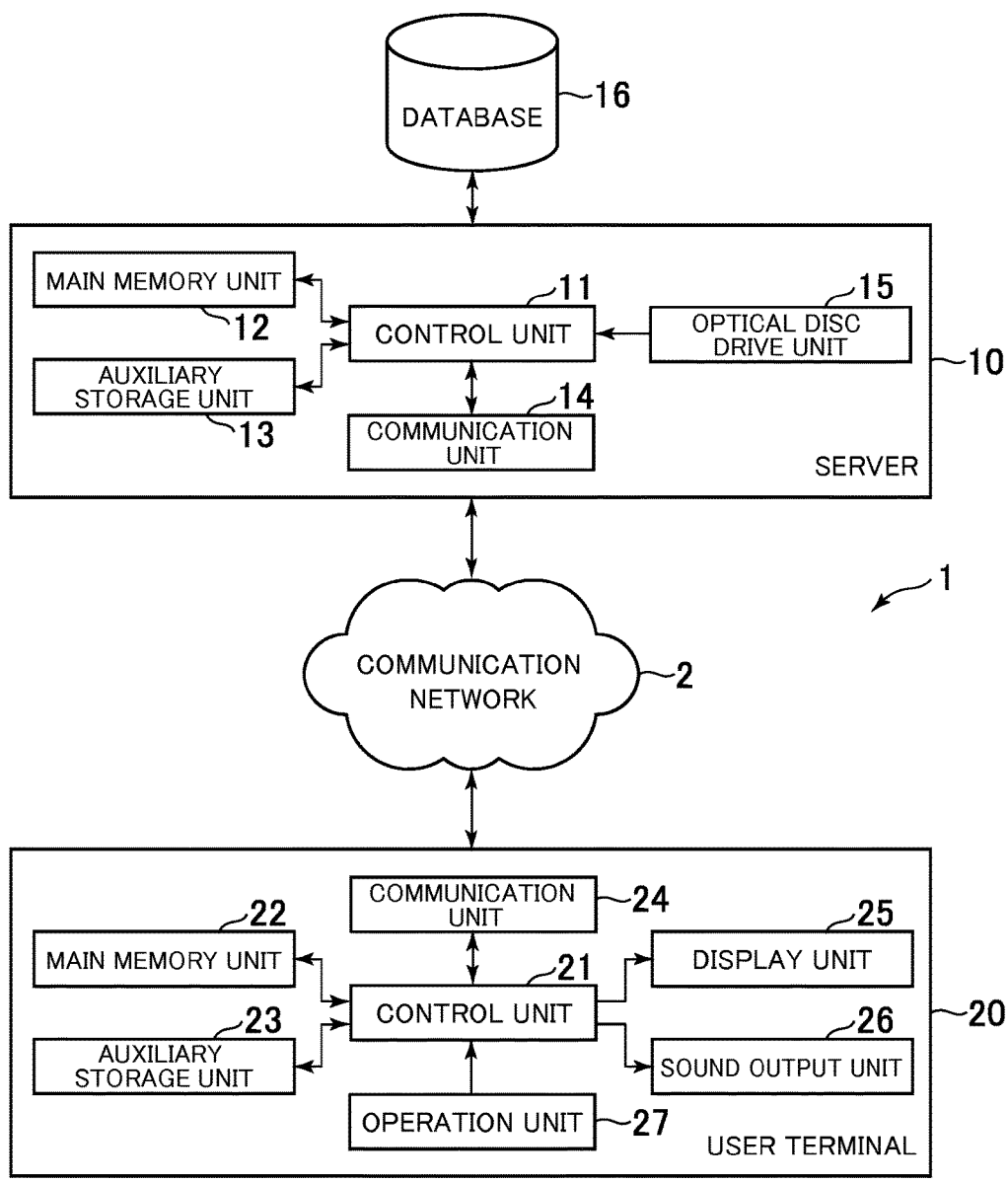
FIG. 1 is a diagram illustrating an example of an overall configuration of an image search system according to an embodiment of the present invention.

FIG. 1 is an example of an overall configuration of an image search system 1 according to the embodiment of the present invention. As illustrated in FIG. 1, the image search system 1 according to this embodiment includes a server 10, a database 16, and a user terminal 20. The server 10 and the user terminal 20 are connected to a communication network 2 including the Internet, for example, so that mutual data communication can be performed between the server 10 and the user terminal 20.

The server 10 includes a control unit 11, a main memory unit 12, an auxiliary storage unit 13, a communication unit 14, and an optical disc drive unit 15. The control unit 11 includes, for example, one or a plurality of CPUs, and executes information processing in accordance with an operating system or a program stored in the auxiliary storage unit 13. The main memory unit 12 is, for example, a RAM. The auxiliary storage unit 13 is, for example, a hard disk or a solid state drive. The communication unit 14 is used for performing data communication via the communication network 2. The optical disc drive unit 15 is used for reading a program or data recorded on an optical disc (information storage medium).

For example, the program or data is supplied to the auxiliary storage unit 13 via an optical disc (information storage medium). Specifically, the program or data stored on the optical disc is read by the optical disc drive unit 15 and stored in the auxiliary storage unit 13. Note that, the server 10 may include a component necessary for reading a program or data stored in an information storage medium other than the optical disc (for example, a memory card). Then, the program or data may be supplied to the auxiliary storage unit 13 via the information storage medium other than the optical disc (for example, a memory card). Alternatively, a program or data may be supplied to the auxiliary storage unit 13 via the communication network 2.

The server 10 is accessible to the database 16. A large number of images to be subjected to an image search are stored in the database 16. Note that, the database 16 may be built in the server 10, or may be built in another server from the server 10.

The user terminal 20 is an information processing device used by a user. The user terminal 20 includes a control unit 21, a main memory unit 22, an auxiliary storage unit 23, a communication unit 24, a display unit 25, a sound output unit 26, and an operation unit 27. The control unit 21, the main memory unit 22, the auxiliary storage unit 23, and the communication unit 24 are the same as the control unit 11, the main memory unit 12, the auxiliary storage unit 13, and the communication unit 14 of the server 10.

For example, a program or data is supplied to the auxiliary storage unit 23 via the communication network 2. Note that, the user terminal 20 may include an optical disc drive unit. Then, a program or data may be supplied to the auxiliary storage unit 23 via an optical disc (information storage medium). Alternatively, the user terminal 20 may include a component necessary for reading a program or data stored in an information storage medium other than the optical disc (for example, a memory card). Then, the program or data may be supplied to the auxiliary storage unit 23 via the information storage medium other than the optical disc (for example, a memory card).

The display unit 25 is, for example, a liquid crystal display or an organic EL display, and displays various kinds of screens. The sound output unit 26 is, for example, a speaker or a headphone terminal, and outputs various kinds of sound.

The operation unit 27 is used by a user for operation. For example, a pointing device for allowing the user to specify a position in the screen displayed on the display unit 25 is equipped as the operation unit 27. For example, a touch panel overlaid on the display unit 25 is equipped in the user terminal 20. Note that, the user terminal 20 may include, for example, a mouse or a stick instead of the touch panel.

The image search system 1 according to this embodiment is configured to search for an image that differs in a specific part from an original image. This image search function is now described. Note that, the following description exemplifies a search for an image that differs in a specific part from a clothing image.

Figure 2:
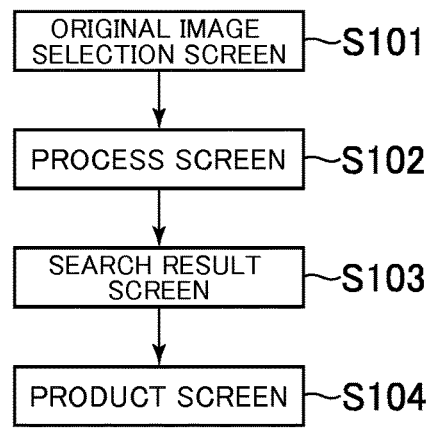
FIG. 2 is a flow illustrating an example of a transition of screens when an image search is performed.

FIG. 2 is a flow illustrating an example of a transition of screens displayed on the display unit 25 of the user terminal 20 when an image search is performed.

When an image search is performed, as illustrated in FIG. 2, an original image selection screen is first displayed on the display unit 25 (S101). The original image selection screen is a screen for selecting an original image to be used for the image search from among images stored in the database 16.

When the original image is selected on the original image selection screen, a process screen is displayed on the display unit 25 (S102). The process screen is a screen for processing the original image.

Figure 3:
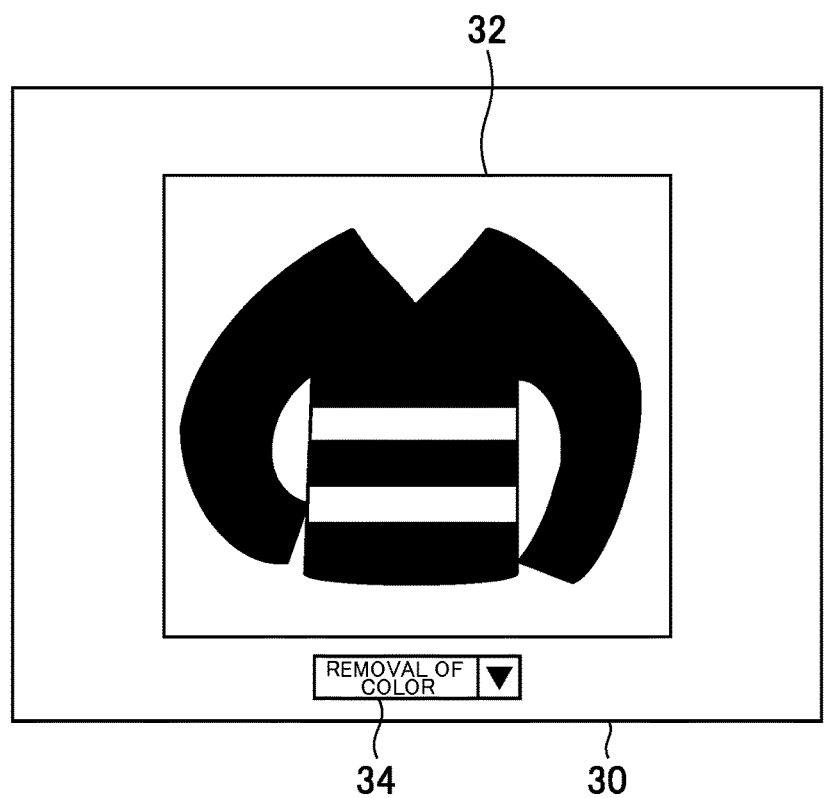
FIG. 3 is a diagram illustrating an example of a process screen.

FIG. 3 illustrates an example of a process screen. On a process screen 30, an original image 32 selected on the original image selection screen is displayed. On the process screen 30 illustrated in FIG. 3, an image of a long-sleeved cut and sewn is displayed as the original image 32. Note that, FIG. 3 illustrates the process screen 30 in an initial state. On the process screen 30 in the initial state, the original image 32 in an unprocessed state is displayed. Note that, in this embodiment, a background part of the original image 32 (part other than the clothes) is removed. The removal of the background part may be executed when the original image 32 is displayed on the process screen 30, or an image from which the background part is removed in advance may be stored in the database 16.

A menu 34 (pull-down menu) for designating the content of a process is further displayed on the process screen 30. Note that, a radio button (option button) or the like for designating the content of a process may be displayed instead of the menu 34.

The user designates the content of the process for the original image 32 via the menu 34, and thereafter performs a processing operation corresponding to the content of the process. For example, the following contents of the process can be designated via the menu 34.

Figure 4:
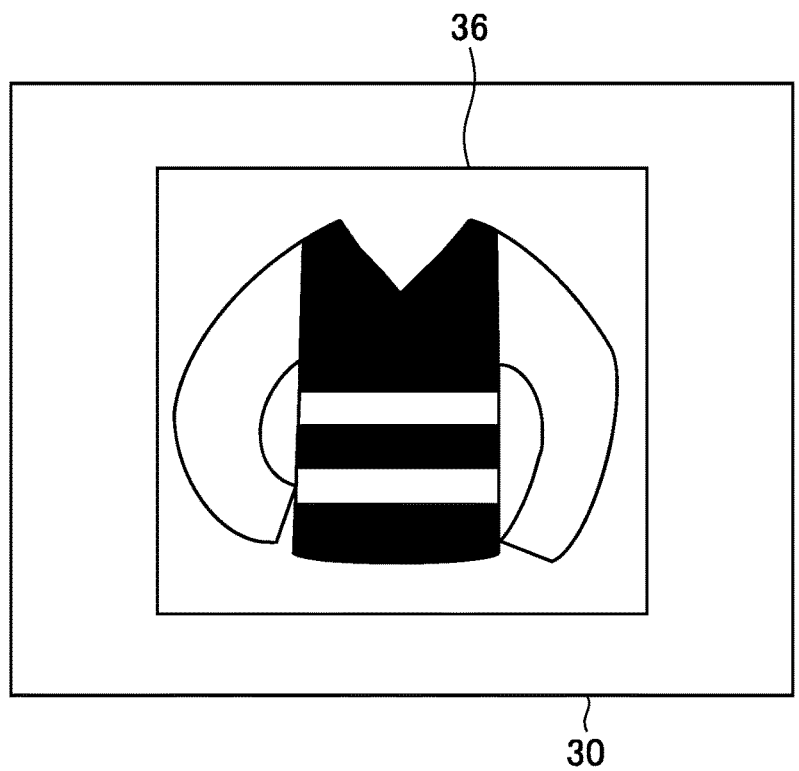
FIG. 4 is a diagram illustrating an example of a process for an original image.
Figure 5:
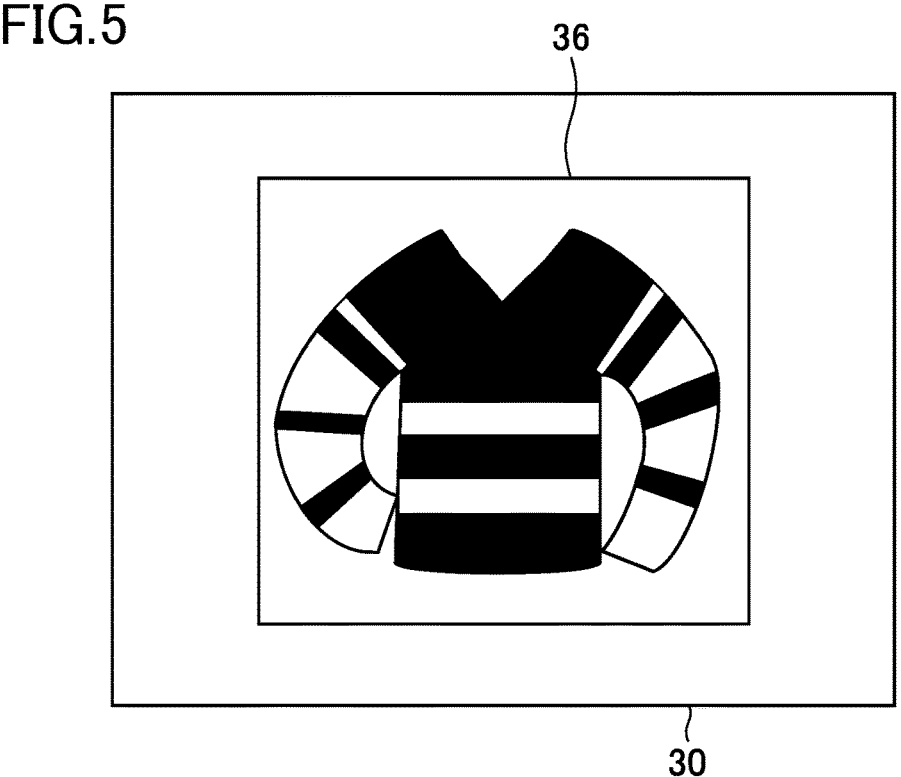
FIG. 5 is a diagram illustrating another example of the process for the original image.
Figure 6:
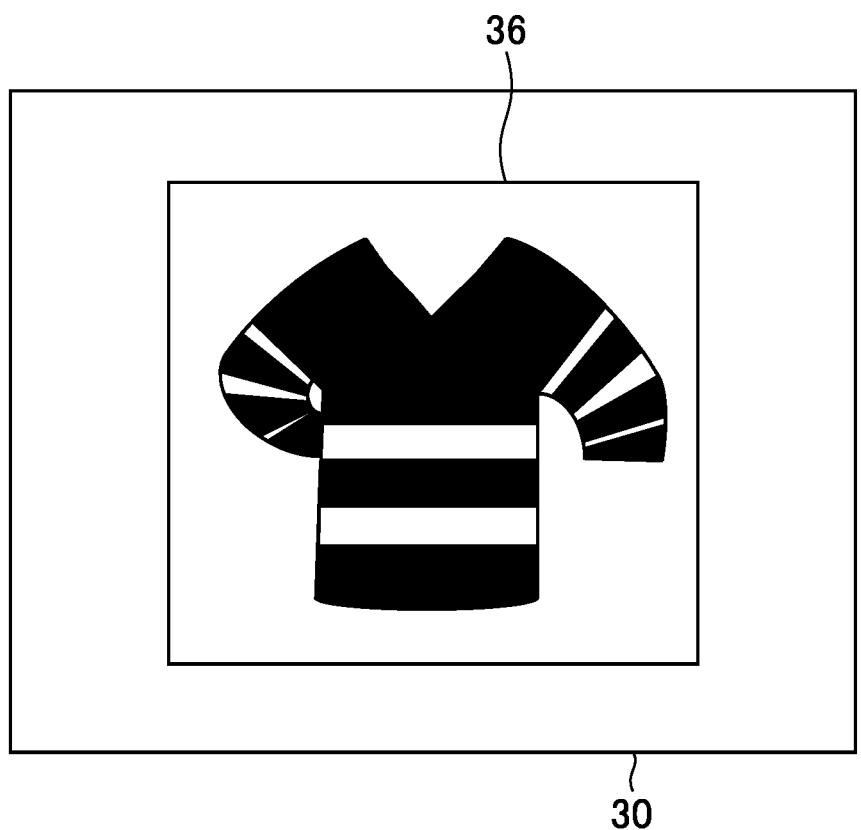
FIG. 6 is a diagram illustrating still another example of the process for the original image.

(1) Removal of color (decolorization)
(2) Change of color
(3) Removal of pattern
(4) Change of pattern
(5) Change of shape The above-mentioned contents of the process are now described. FIGS. 4 to 6 illustrate examples of the process screen 30 when the original image 32 is processed. On the process screens 30 illustrated in FIGS. 4 to 6, an image (hereinafter referred as a processed image) 36 obtained by processing the original image 32 are displayed.

The removal of color is described. FIG. 4 illustrates the case where the color of the sleeve part of the original image 32 is removed. In a case of removing the color of the sleeve part, the user first selects the removal of color in the menu 34. After that, the user specifies pixels of the sleeve part (that is, pixels whose color is to be removed), thereby removing the color of the sleeve part. For example, the user performs the process as illustrated in FIG. 4 when importance is placed on parts other than the sleeve part and no importance is placed on the color of the sleeve part.

The change of color is described. For example, in a case of changing the color of the sleeve part of the original image 32, the user first selects the change of color in the menu 34. When the change of color is selected, a menu for selecting a desired color is displayed, and the user then designates a desired color. After that, the user specifies pixels of the sleeve part (that is, pixels whose color is to be changed), thereby changing the color of the sleeve part to the above-mentioned desired color. For example, the user performs the process described above when the user intends to search for an image of a long-sleeved cut and sewn in which the color of the sleeve part of the long-sleeved cut and sewn shown in the original image 32 is changed to a desired color.

The removal of pattern is described. For example, in a case of removing the pattern of the sleeve part of the original image 32, the user first selects the removal of pattern in the menu 34. After that, the user specifies pixels of the sleeve part (that is, pixels whose pattern is to be removed), thereby removing the pattern of the sleeve part. For example, the user performs the process described above when importance is placed on parts other than the sleeve part and no importance is placed on the pattern of the sleeve part.

The change of pattern is described. FIG. 5 illustrates the case where the pattern of the sleeve part of the original image 32 is changed. In a case of changing the pattern of the sleeve part, the user first selects the change of pattern in the menu 34. When the change of pattern is selected, a menu for changing the pattern is displayed, and the user then changes the pattern of the sleeve part to a desired pattern. For example, the user performs the process illustrated in FIG. 5 when the user intends to search for an image of a long-sleeved cut and sewn in which the pattern of the sleeve part of the long-sleeved cut and sewn shown in the original image 32 is changed to a desired pattern.

The change of shape is described. FIG. 6 illustrates the case where the shape of the sleep pattern of the original image 32 is changed. On the process screen 30 illustrated in FIG. 6, the sleeve part is changed in shape so as to shrink upward. In a case of changing the shape of the sleeve part, the user first selects the change of shape in the menu 34. After that, the user designates a region surrounding the sleeve part (that is, a part whose shape is to be changed) and changes the shape of the region so as to shrink upward, for example, thereby changing the shape of the sleeve part. For example, the user performs the process as illustrated in FIG. 6 when the user intends to search for a short-sleeved cut and sewn having the same color and pattern as those of the long-sleeved cut and sewn shown in the original image 32.

Note that, it is not that the user can perform only one process content among those described above on the process screen 30. The user can perform a plurality of process contents among those described above. For example, the removal of color can be performed after the change of shape is performed.

When the user completes the process on the process screen 30 and performs a search instruction operation, images similar to the processed image 36 are searched for. Then, a search result screen is displayed on the display unit 25 (S103).

Figure 7:
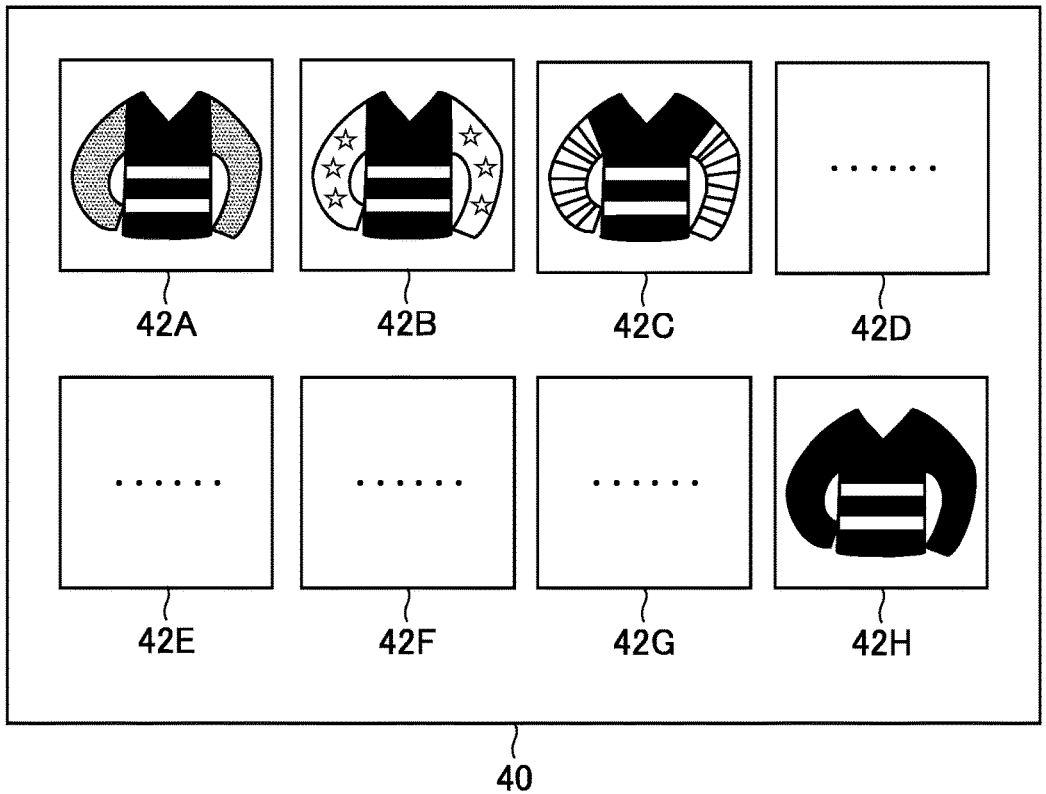
FIG. 7 is a diagram illustrating an example of a search result screen.

FIG. 7 illustrates an exemplary search result screen. Note that, FIG. 7 illustrates a search result screen 40 displayed when an image search is executed based on the processed image 36 (see FIG. 4) obtained by removing the color of the sleeve part of the original image 32.

The search result screen 40 illustrated in FIG. 7 shows that eight images 42A, 42B, 42C, 42D, 42E, 42F, 42G, and 42H are found as images similar to the processed image 36. Note that, the images 42D, 42E, 42F, and 42G are omitted in FIG. 7.

The images 42A to 42H acquired as search results are displayed on the search result screen 40 in accordance with an output order of each image. The images are displayed on the search result screen 40 in the descending output order. Thus, the image 42A is an image having the highest output order and the image 42H is an image having the lowest output order. Note that, the image 42H is the original image 32 (that is, the image before processed). In other words, the output order of the original image 32 is set to the lowest level.

In the image search system 1, the output order of each of the images 42A to 42H is set so that an image having a lower degree of similarity with the original image 32 (that is, the image before processed) may have a higher output order. In the case where the user purposely processes the original image 32 before an image search, it is more likely that the original image 32 is not an image intended to be found by the user and that an image having a high degree of similarity with the original image 32 is not an image intended to be found by the user. In this regard, the image search system 1 sets the output order as described above, thereby preventing the original image 32 itself or an image having a high degree of similarity with the original image 32 from being preferentially displayed.

When the user selects any one of the images 42A to 42H displayed on the search result screen 40, a product screen showing detailed information on a product (clothes) shown in the selected image is displayed (S104). For example, the product can be purchased via the product screen.

Figure 8:
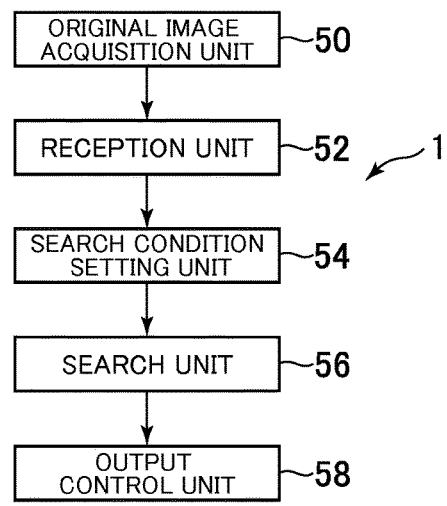
FIG. 8 is a functional block diagram of the image search system.

The configuration for implementing the image search function as described above is now described. FIG. 8 is a functional block diagram illustrating the functions implemented in the image search system 1. As illustrated in FIG. 8, the image search system 1 includes an original image acquisition unit 50, a reception unit 52, a search condition setting unit 54, a search unit 56, and an output control unit 58.

For example, those functional blocks are implemented on the server 10 or the user terminal 20. For example, the original image acquisition unit 50, the reception unit 52, and the search condition setting unit 54 are implemented on the user terminal 20, and the search unit 56 and the output control unit 58 are implemented on the server 10. Specifically, the control unit 21 of the user terminal 20 executes processing in accordance with a program, and the control unit 21 thereby functions as the original image acquisition unit 50, the reception unit 52, and the search condition setting unit 54. Further, the control unit 11 of the server 10 executes processing in accordance with a program, and the control unit 11 thereby functions as the search unit 56 and the output control unit 58.

The original image acquisition unit 50 acquires the original image 32 to be used for an image search. In this embodiment, the original image acquisition unit 50 acquires the original image 32 selected by the user on the original image selection screen.

The reception unit 52 receives the designation of a partial region in the original image 32 to be processed and the process content for the partial region. In this embodiment, the reception unit 52 displays the process screen 30 on the display unit 25, thereby receiving the process for the partial region of the original image 32. In other words, the reception unit 52 receives the process for the partial region of the original image 32, thereby receiving the designation of the partial region in the original image 32 to be processed and the process content for the partial region.

Note that, the process screen 30 is displayed to allow the user to actually process the original image 32, thereby receiving the designation of a partial region to be processed and the process content for the partial region. Alternatively, however, the reception unit 52 may receive the designation of the partial region to be processed and the process content for the partial region without allowing the user to actually process the original image 32.

The search condition setting unit 54 sets a search condition for searching for an image identical or similar to the processed image 36 based on a plurality of kinds of feature information on a non-processed region of the processed image 36 obtained by applying a process of the process content specified by the user to a partial region of the original image 32, and at least one piece of feature information selected based on the process content applied to the processed region among a plurality of kinds of feature information on the processed region of the processed image 36.

Figures 9, 10:
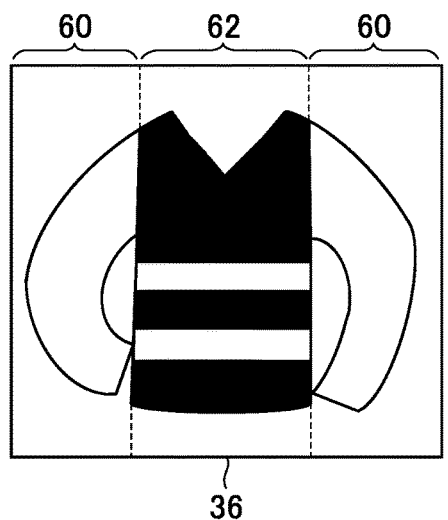
FIG. 9 is a diagram for explaining a processed region and a non-processed region.
FIG. 10 is a table showing an example of correspondence relationship between the content of the process for the processed region and feature information of the processed region used for an image search.

The processed region as used herein is a region including a part designated as a process target (that is, a processed part). Further, the non-processed region as used herein is a region other than the processed region. FIG. 9 is a diagram for explaining the processed region and the non-processed region. FIG. 9 illustrates the processed region and the non-processed region when the sleeve part is designated as the process target (that is, when the sleeve part is processed). As illustrated in FIG. 9, when the sleeve part is designated as the process target, a rectangular region including the sleeve part is set as the processed region 60. Further, the region other than the processed region 60 is set as the non-processed region 62.

The search condition setting unit 54 acquires a plurality of kinds of feature information on the non-processed region 62 of the processed image 36. The plurality of kinds of feature information in this case are the following pieces of feature information, for example. Note that, a well-known method may be employed as the method of extracting those pieces of feature information.
(1) Feature information on the color (feature value)
(2) Feature information on the pattern (feature value)
(3) Feature information on the shape (feature value)

The search condition setting unit 54 further acquires at least one piece of feature information selected based on the process content applied to the processed region 60 of the processed image 36 among a plurality of kinds of feature information on the processed region 60.

The plurality of kinds of feature information in this case are also the above-mentioned pieces of feature information (1) to (3), for example. The search condition setting unit 54 selects, from among the above-mentioned pieces of feature information (1) to (3) on the processed region 60 of the processed image 36, feature information to be used for an image search based on the process content for the processed region 60.

FIG. 10 shows an exemplary correspondence relationship between the process content for the processed region 60 and feature information on the processed region 60 to be used for an image search.

Note that, a circle in the process content for the processed region field of FIG. 10 indicates the process content designated as the process content for the processed region 60 (that is, the process content applied to the processed region 60). Further, in the feature information on the processed region to be used for an image search field of FIG. 10, a circle indicates that feature information is used for an image search, and a blank indicates that feature information is not used for the image search.

For example, in the case (A) of FIG. 10, the color-removal field in the process content for the processed region field is marked with a circle. This indicates the case where the removal of color is designated as the process content for the processed region 60. Further, in the case (A) of FIG. 10, in the feature information on the processed region to be used for an image search field, the pattern field and the shape field are marked with circles, and the color field is blank. This indicates that feature information on the pattern and shape of the processed region 60 is used for an image search but feature information on the color of the processed region 60 is not used for the image search.

As a result, for example, when the color of the sleeve part is removed as illustrated in FIG. 4, among the above-mentioned pieces of feature information (1) to (3) on the processed region 60, only the feature information on the pattern and shape is used for an image search but the feature information on the color is not used for the image search. For example, the case where the user removes the color of the sleeve part is the case where the user does not designate the color of the sleeve part. Thus, the feature information on the color of the processed region 60 is not used for an image search. Further, the case where the user does not remove or change the pattern of the sleeve part is the case where the user intends to search for clothes whose pattern of the sleeve part is identical or similar to that of the sleeve part shown in the original image 32. Similarly, the case where the user does not change the shape of the sleeve part is the case where the user intends to search for clothes whose shape of the sleeve part is identical or similar to that of the sleeve part shown in the original image 32. Thus, the feature information on the pattern and shape of the processed region 60 is used for an image search.

In addition, for example, in the case (B) of FIG. 10, the color-removal field and the change of shape field in the process content for the processed region field are marked with circles. Therefore, (B) of FIG. 10 indicates the case where the removal of color and the change of shape are designated as the process contents for the processed region 60. Further, in the case (B) of FIG. 10, in the feature information on the processed region to be used for an image search field, the pattern field and the shape field are marked with circles, and the color field is blank. This indicates that feature information on the pattern and shape of the processed region 60 is used for an image search but feature information on the color of the processed region 60 is not used for the image search.

The case where the user removes the color of the sleeve part and changes the shape of the sleeve part is the case where the user does not designate the color of the sleeve part but designates the shape of the sleeve part. Thus, the feature information on the color of the processed region 60 is not used for an image search, while the feature information on the shape of the processed region 60 is used for the image search. Further, the case where the user does not remove or change the pattern of the sleeve part is the case where the user intends to search for clothes whose pattern of the sleeve part is identical or similar to that of the sleeve part shown in the original image 32. Thus, the feature information on the pattern of the processed region 60 is used for an image search.

In addition, for example, in the case (C) of FIG. 10, the pattern-removal field in the process content for the processed region field is marked with a circle. This indicates the case where the removal of pattern is designated as the process content for the processed region 60. Further, in the case (C) of FIG. 10, in the feature information on the processed region to be used for an image search field, the color field and the shape field are marked with circles, and the pattern field is blank. This indicates that feature information on the color and shape of the processed region 60 is used for an image search but feature information on the pattern of the processed region 60 is not used for the image search.

The case where the user removes the pattern of the sleeve part is the case where the user does not designate the pattern of the sleeve part. Thus, the feature information on the pattern of the processed region 60 is not used for an image search. Further, the case where the user does not remove or change the color of the sleeve part is the case where the user intends to search for clothes whose color of the sleeve part is identical or similar to that of the sleeve part shown in the original image 32. Similarly, the case where the user does not change the shape of the sleeve part is the case where the user intends to search for clothes whose shape of the sleeve part is identical or similar to that of the sleeve part shown in the original image 32. Thus, the feature information on the color and shape of the processed region 60 is used for an image search.

In addition, for example, in the case (D) of FIG. 10, the pattern-removal field and the change of shape field in the process content for the processed region field are marked with circles. This indicates the case where the removal of pattern and the change of shape are designated as the process contents for the processed region 60. Further, in the case (D) of FIG. 10, in the feature information on the processed region to be used for an image search field, the color field and the shape field are marked with circles, and the pattern field is blank. This indicates that feature information on the color and shape of the processed region 60 is used for an image search but feature information on the pattern of the processed region 60 is not used for the image search.

The case where the user removes the pattern of the sleeve part and changes the shape of the sleeve part is the case where the user does not designate the pattern of the sleeve part but designates the shape of the sleeve part. Thus, the feature information on the pattern of the processed region 60 is not used for an image search, while the feature information on the shape of the processed region 60 is used for the image search. Further, the case where the user does not remove or change the color of the sleeve part is the case where the user intends to search for clothes whose color of the sleeve part is identical or similar to that of the sleeve part shown in the original image 32. Thus, the feature information on the color of the processed region 60 is used for an image search.

In addition, for example, in the case (E) of FIG. 10, the color-removal field and the pattern-removal field in the process content for the processed region field are marked with circles. This indicates the case where the removal of color and the removal of pattern are designated as the process contents for the processed region 60. Further, in the case (E) of FIG. 10, only the shape field is marked with a circle, and the color field and the pattern field are blank. This indicates that only feature information on the shape of the processed region 60 is used for an image search but feature information on the color and pattern of the processed region 60 is not used for the image search.

The case where the user removes the color and pattern of the sleeve part is the case where the user does not designate the color and pattern of the sleeve part. Thus, the feature information on the color and pattern of the processed region 60 is not used for an image search. Further, the case where the user does not change the shape of the sleeve part is the case where the user intends to search for clothes whose shape of the sleeve part is identical or similar to that of the sleeve part shown in the original image 32. Thus, the feature information on the shape of the processed region 60 is used for an image search.

In addition, for example, in the case (F) of FIG. 10, the color-removal field, the pattern-removal field, and the change of shape field in the process content for the processed region field are marked with circles. This indicates the case where the removal of color, the removal of pattern, and the change of shape are designated as the process contents for the processed region 60. Further, in the case (F) of FIG. 10, in the feature information on the processed region to be used for an image search field, the shape field is marked with a circle, and the color field and the pattern field are blank. This indicates that feature information on the shape of the processed region 60 is used for an image search but feature information on the color and pattern of the processed region 60 is not used for the image search.

The case where the user removes the color and pattern of the sleeve part and changes the shape of the sleeve part is the case where the user does not designate the color and pattern of the sleeve part but designates the shape of the sleeve part. Thus, the feature information on the color and pattern of the processed region 60 is not used for an image search, while the feature information on the shape of the processed region 60 is used for the image search.

Note that, the correspondence relationship shown in FIG. 10 indicates that feature information on the color, pattern, and shape of the processed region 60 is used for an image search in the cases ((G) to (M)) other than the above-mentioned cases.

For example, in the case (G) of FIG. 10, the color-change field in the process content for the processed region field is marked with a circle. This indicates the case where the change of color is designated as the process content for the processed region 60. Further, in the case (G) of FIG. 10, in the feature information on the processed region to be used for an image search field, the color field, the pattern field, and the shape field are marked with circles.

The case where the user changes the color of the sleeve part is the case where the user positively designates the color of the sleeve part. Thus, the feature information on the color of the processed region 60 is used for an image search. Further, the case where the user does not remove or change the pattern of the sleeve part is the case where the user intends to search for clothes whose pattern of the sleeve part is identical or similar to that of the sleeve part shown in the original image 32. Thus, the feature information on the pattern of the processed region 60 is also used for an image search. Similarly, the case where the user does not change the shape of the sleeve part is the case where the user intends to search for clothes whose shape of the sleeve part is identical or similar to that of the sleeve part shown in the original image 32. Thus, the feature information on the shape of the processed region 60 is also used for an image search.

In addition, for example, in the case (H) of FIG. 10, the pattern-change field in the process content for the processed region field is marked with a circle. This indicates the case where the change of pattern is designated as the process content for the processed region 60. Further, in the case (H) of FIG. 10, in the feature information on the processed region to be used for an image search field, the color field, the pattern field, and the shape field are marked with circles.

As a result, for example, when the pattern of the sleeve part is changed as illustrated in FIG. 5, all the above-mentioned pieces of feature information (1) to (3) on the processed region 60 are used for an image search. For example, the case where the user changes the pattern of the sleeve part is the case where the user positively designates the pattern of the sleeve part. Thus, the feature information on the pattern of the processed region 60 is used for an image search. Further, the case where the user does not remove or change the color of the sleeve part is the case where the user intends to search for clothes whose color of the sleeve part is identical or similar to that of the sleeve part shown in the original image 32. Thus, the feature information on the color of the processed region 60 is also used for an image search. Similarly, the case where the user does not change the shape of the sleeve part is the case where the user intends to search for clothes whose shape of the sleeve part is identical or similar to that of the sleeve part shown in the original image 32. Thus, the feature information on the shape of the processed region 60 is also used for an image search.

In addition, for example, in the case (I) of FIG. 10, the change of shape field in the process content for the processed region field is marked with a circle. This indicates the case where the change of shape is designated as the process content for the processed region 60. Further, in the case (I) of FIG. 10, in the feature information on the processed region to be used for an image search field, the color field, the pattern field, and the shape field are marked with circles.

As a result, for example, when the shape of the sleeve part is changed as illustrated in FIG. 6, all the above-mentioned pieces of feature information (1) to (3) on the processed region 60 are used for an image search. For example, the case where the user changes the shape of the sleeve part is the case where the user positively designates the shape of the sleeve part. Thus, the feature information on the shape of the processed region 60 is used for an image search. Further, the case where the user does not remove or change the color and pattern of the sleeve part is the case where the user intends to search for clothes whose color and pattern of the sleeve part are identical or similar to those of the sleeve part shown in the original image 32. Thus, the feature information on the color and pattern of the processed region 60 is also used for an image search.

Note that, also in the cases (J) to (M) of FIG. 10, similarly to the same reason as (G) to (I) of FIG. 10, all the above-mentioned pieces of feature information (1) to (3) on the processed region 60 are used for an image search.

By the way, when the removal of color is designated as the process content for the processed region 60, it may be considered that the user does not intend to designate the pattern as well as the color. Thus, when the removal of color is designated as the process content for the processed region 60 (for example, (A) and (B) of FIG. 10), not only the feature information on the color of the processed region 60 but also the feature information on the pattern of the processed region 60 may not be used for an image search.

The search unit 56 searches for an image identical or similar to the processed image 36 based on the search condition set by the search condition setting unit 54. The details are described later (see FIG. 12).

The output control unit 58 causes an output unit to output search results of the search unit 56. In this embodiment, the output control unit 58 causes the display unit 25 to display the search result screen 40.

Further, in this embodiment, the output control unit 58 (output order setting means) sets the output order of each of images searched for by the search unit 56 based on the degree of similarity between each of the images searched for by the search unit 56 and the original image 32 (that is, the unprocessed original image). Then, the output control unit 58 causes the output unit to output the images searched for by the search unit 56 in accordance with the output order of each of the images searched for by the search unit 56.

For example, the output control unit 58 (output order setting means) sets the output order of an image having a low degree of similarity with the original image 32 to be higher than the output order of an image having a high degree of similarity with the original image 32.

For example, when a first image and a second image are included in images searched for by the search unit 56 and when the degree of similarity between the original image 32 and the first image is lower than the degree of similarity between the original image 32 and the second image, the output control unit 58 sets the output order of the first image to be higher than the output order of the second image. In other words, the output control unit 58 decreases the output order of the second image to be lower than the output order of the first image.

Figure 11:
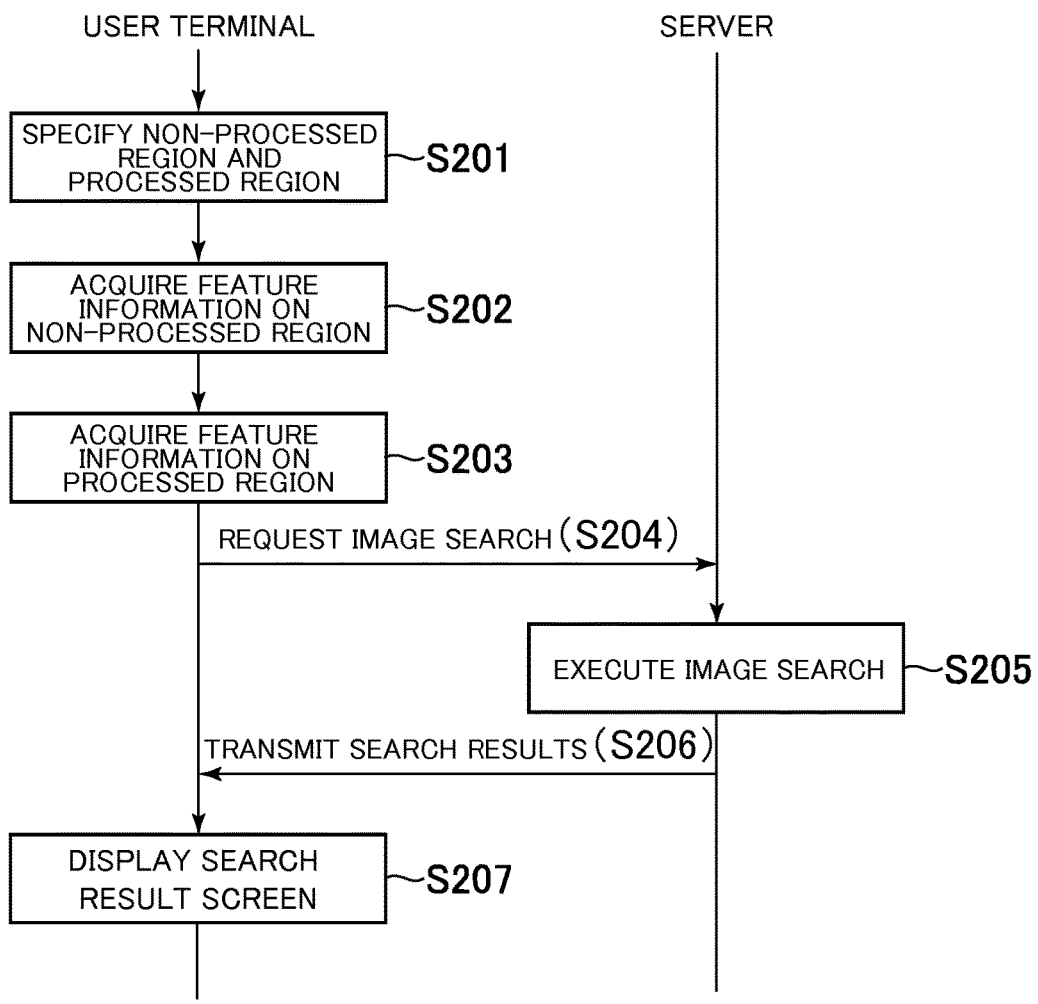
FIG. 11 is a flowchart illustrating example of processing executed by the image search system.

Next, processing executed in the image search system 1 is described. FIG. 11 is a flowchart illustrating exemplary processing executed when the process for the original image 32 is completed on the process screen 30 and a search instruction operation is performed by the user. The control unit 21 of the user terminal 20 executes the processing illustrated in FIG. 11 in accordance with a program, and the control unit 21 thereby functions as a search condition setting unit 54. Further, the control unit 11 of the server 10 executes the processing illustrated in FIG. 11 in accordance with a program, and the control unit 11 thereby functions as a search unit 56 and an output control unit 58.

When the process for the original image 32 is completed on the process screen 30 and a search instruction operation is performed by the user, as illustrated in FIG. 11, the control unit 21 of the user terminal 20 specifies the processed region 60 and the non-processed region 62 of the processed image 36 based on the process content performed on the process screen 30 (S201).

After that, the control unit 21 acquires feature information on the non-processed region 62 of the processed image 36 (S202). For example, the control unit 21 acquires feature information on the color, pattern, and shape of the non-processed region 62.

The control unit 21 further acquires feature information on the processed region 60 of the processed image 36 (S203). For example, the control unit 21 acquires at least one of pieces of feature information on the color, pattern, and shape of the processed region 60 based on the process content applied to the processed region 60 and the correspondence relationship shown in FIG. 10.

After that, the control unit 21 requests the server 10 to execute an image search (S204). For example, the control unit 21 transmits the following pieces of information to the server 10.

Identification information on the original image 32
Information indicating the processed region 60 and the non-processed region 62
Feature information on the processed region 60
Feature information on the non-processed region 62

When the above-mentioned request is received by the server 10, the control unit 11 of the server 10 executes an image search based on the information received from the user terminal 20 (S205).

In Step S205, each image stored in the database 16 is set as a comparison target to be compared with the processed image 36, and, for example, processing illustrated in FIG. 12 is executed. Note that, in this embodiment, when the processing illustrated in FIG. 12 is executed, the background part (part other than clothes) of the comparison target image is removed. Alternatively, an image from which the background part is removed in advance is stored in the database 16.

Specifically, the control unit 11 acquires feature information on the non-processed region 62 of the image set as the comparison target to be compared with the processed image 36 (comparison target image) (S301). Note that, the non-processed region 62 of the comparison target image as used herein means a region of the comparison target image corresponding to the non-processed region 62 of the processed image 36.

After that, the control unit 11 calculates a degree of similarity (first degree of similarity) between the feature information on the non-processed region 62 of the processed image 36 and the feature information on the non-processed region 62 of the comparison target image (S302). Specifically, the control unit 11 calculates the above-mentioned degree of similarity by comparing the feature information on the color, pattern, and shape of the non-processed region 62 of the processed image 36 to the feature information on the color, pattern, and shape of the non-processed region 62 of the comparison target image.

Then, the control unit 11 determines whether or not the degree of similarity calculated in Step S302 is equal to or higher than a threshold (first reference degree of similarity) (S303). When the degree of similarity is not equal to or higher than the threshold, the control unit 11 determines that the comparison target image is not similar to the processed image 36.

When the degree of similarity calculated in Step S302 is equal to or higher than the threshold, the control unit 11 acquires feature information on the processed region 60 of the comparison target image (S304). Note that, the processed region 60 of the comparison target image as used herein means a region of the comparison target image corresponding to the processed region 60 of the processed image 36.

After that, the control unit 11 calculates a degree of similarity (second degree of similarity) between the feature information on the processed region 60 of the processed image 36 and the feature information on the processed region 60 of the comparison target image (S305).

For example, when the processed image 36 is an image obtained by applying the process of removal of color to the processed region 60 of the original image 32, as shown in (A) of FIG. 10, feature information on the pattern and shape of the processed region 60 of the processed image 36 is used but feature information on the color of the processed region 60 of the processed image 36 is not used. Thus, the above-mentioned degree of similarity is calculated by comparing the feature information on the pattern and shape of the processed region 60 of the processed image 36 to the feature information on the pattern and shape of the processed region 60 of the comparison target image.

In addition, for example, when the processed image 36 is an image obtained by applying the process of removal of pattern to the processed region 60 of the original image 32, as shown in (C) of FIG. 10, feature information on the color and shape of the processed region 60 of the processed image 36 is used but feature information on the pattern of the processed region 60 of the processed image 36 is not used. Thus, the above-mentioned degree of similarity is calculated by comparing the feature information on the color and shape of the processed region 60 of the processed image 36 to the feature information on the color and shape of the processed region 60 of the comparison target image.

In addition, for example, when the processed image 36 is an image obtained by applying the processes of removal of color and removal of pattern to the processed region 60 of the original image 32, as shown in (E) of FIG. 10, only feature information on the shape of the processed region 60 of the processed image 36 is used but feature information on the color and pattern of the processed region 60 of the processed image 36 is not used. Thus, the above-mentioned degree of similarity is calculated by comparing the feature information on the shape of the processed region 60 of the processed image 36 to the feature information on the shape of the processed region 60 of the comparison target image.

In addition, for example, when the processed image 36 is an image obtained by applying only the process of change of pattern to the processed region 60 of the original image 32, as shown in (H) of FIG. 10, feature information on the color, pattern, and shape of the processed region 60 of the processed image 36 is used. Thus, the above-mentioned degree of similarity is calculated by comparing the feature information on the color, pattern, and shape of the processed region 60 of the processed image 36 to the feature information on the color, pattern, and shape of the processed region 60 of the comparison target image.

In addition, for example, when the processed image 36 is an image obtained by applying the process of change of shape to the processed region 60 of the original image 32, as shown in (I) of FIG. 10, feature information on the color, pattern, and shape of the processed region 60 of the processed image 36 is used. Thus, the above-mentioned degree of similarity is calculated by comparing the feature information on the color, pattern, and shape of the processed region 60 of the processed image 36 to the feature information on the color, pattern, and shape of the processed region 60 of the comparison target image.

After the processing of Step S305 is executed, the control unit 11 determines whether or not the degree of similarity calculated in Step S305 is equal to or higher than a threshold (second reference degree of similarity) (S306). Note that, the threshold (second reference degree of similarity) used in Step S306 is set to be lower than the threshold (first reference degree of similarity) used in Step S303. In other words, a rough search is executed for the processed region 60 as compared to the non-processed region 62. Specifically, a relatively rough search is executed for a part purposely processed by the user, thereby being capable of presenting as many search results as possible to the user.

When the degree of similarity calculated in Step S305 is not equal to or higher than the threshold, the control unit 11 determines that the comparison target image is not similar to the processed image 36.

On the other hand, when the degree of similarity calculated in Step S305 is equal to or higher than the threshold, the control unit 11 determines that the comparison target image is similar to the processed image 36 (S307). Further, in this case, the control unit 11 acquires a degree of similarity between the comparison target image and the original image 32 (that is, the unprocessed original image) (S308). For example, the control unit 11 calculates the above-mentioned degree of similarity by comparing the feature information on the comparison target image to the feature information on the original image 32. The degree of similarity calculated in Step S308 is used to determine the output order of the comparison target image when displayed on the search result screen 40.

As illustrated in FIG. 11, after the image search (Step S205) is executed, the control unit 11 transmits search results to the user terminal 20 (S206). Specifically, the control unit 11 transmits data indicating a list of images searched for in Step S205 (that is, images determined in Step S307 to be similar to the processed image 36) to the user terminal 20, thereby causing the display unit 25 of the user terminal 20 to display the search result screen. Note that, in this case, the control unit 11 sets the output order of each of the images searched for in Step S205 based on the degree of similarity acquired in Step S308. Specifically, the output order is set to be higher for an image having a lower degree of similarity acquired in Step S308.

When the search results are received by the user terminal 20, the control unit 21 of the user terminal 20 displays the search result screen on the display unit 25 (S207). The description on the processing illustrated in FIG. 11 is now finished.

According to the image search system 1 described above, it is possible to search for an image that differs in a specific part from the original image 32. For example, it is possible to search for a clothing image that differs in at least one of the color, pattern, and shape of a sleeve part from a clothing image (original image 32).

Note that, the present invention is not intended to be limited to the embodiment described above.

[1] For example, even when the original image 32 (that is, the unprocessed original image) is included in the search results of the search unit 56, the original image 32 may be prevented from being displayed on the search result screen 40.

In the case where the user purposely processes the original image 32 before an image search, the original image 32 is not an image that the user intends to find. In this regard, the above-mentioned configuration can prevent an image unnecessary for the user from being displayed on the search result screen 40.

[2] Further, for example, because the non-processed region 62 of the processed image 36 and the non-processed region 62 of the original image 32 are identical to each other, feature information on the non-processed region 62 of the original image 32 may be acquired instead of feature information on the non-processed region 62 of the processed image 36.

[3] The process screen 30 is displayed to allow the user to actually process the original image 32, thereby receiving the designation of a partial region in the original image 32 to be processed and the process content for the partial region. Alternatively, however, the reception unit 52 may receive the designation of the partial region in the original image 32 to be processed and the process content for the partial region without allowing the user to actually process the original image 32.

For example, when the user selects the removal of color from the menu 34 and further designates the region of the sleeve part, the reception unit 52 may determine that the removal of color of the sleeve part is designated. Similarly, for example, when the user selects the removal of pattern from the menu 34 and further designates the region of the sleeve part, the reception unit 52 may determine that the removal of pattern of the sleeve part is designated.

[4] For example, the search condition setting unit 54 may set the search condition for searching for an image similar to the original image 32 based on a plurality of kinds of feature information on the non-processed region 62 of the original image 32 and at least one piece of feature information selected based on the process content for the processed region 60 from among a plurality of kinds of feature information on the processed region 60 of the original image 32.

For example, when the removal of color is designated as the process content for the sleeve part, the search condition setting unit 54 may set the search condition for searching for an image similar to the original image 32 based on feature information on the color, pattern, and shape of the non-processed region 62 of the original image 32 and feature information on the pattern and shape of the processed region 60 of the original image 32.

In this case, in Step S202 of FIG. 11, the control unit 21 acquires feature information on the non-processed region 62 of the original image 32. For example, the control unit 21 acquires feature information on the color, pattern, and shape of the non-processed region 62 of the original image 32. Further, in Step S203, the control unit 21 acquires feature information on the processed region 60 of the original image 32. For example, the control unit 21 acquires at least one of pieces of feature information on the color, pattern, and shape of the processed region 60 of the original image 32 based on the process content designated as the process content for the processed region 60 and the correspondence relationship shown in FIG. 10. For example, when the removal of color is designated as the process content for the sleeve part ((A) of FIG. 10), the control unit 21 acquires feature information on the pattern and shape of the processed region 60 of the original image 32.

Further, in Step S302 of FIG. 12, the control unit 11 calculates the degree of similarity (first degree of similarity) between the feature information on the non-processed region 62 of the original image 32 and feature information on the non-processed region 62 of the comparison target image. Further, in Step S305, the control unit 11 calculates the degree of similarity (second degree of similarity) between the feature information on the processed region 60 of the original image 32 and feature information on the processed region 60 of the comparison target image. For example, when the removal of color is designated as the process content for the sleeve part ((A) of FIG. 10), the control unit 11 calculates the degree of similarity between the feature information on the pattern and shape of the processed region 60 of the original image 32 and the feature information on the pattern and shape of the processed region 60 of the comparison target image.

Also with this configuration, for example, it is possible to search for a clothing image whose color, pattern, and shape of a trunk part (part other than the sleeve) are identical or similar to those of a trunk part of a clothing image (original image 32) and whose pattern and shape of the sleeve part are identical or similar to those of the sleeve part of the clothing image (original image 32).

Similarly, when the removal of pattern is designated as the process content for the sleeve part ((C) of FIG. 10), in Step S203, the control unit 21 may acquire feature information on the color and shape of the processed region 60 of the original image 32. Further, in Step S305, the control unit 11 may calculate the degree of similarity between the feature information on the color and shape of the processed region 60 of the original image 32 and feature information on the color and shape of the processed region 60 of the comparison target image. Also with this configuration, for example, it is possible to search for a clothing image whose color, pattern, and shape of a trunk part (part other than the sleeve) are identical or similar to those of a trunk part of a clothing image (original image 32) and whose color and shape of the sleeve part are identical or similar to those of the sleeve part of the clothing image (original image 32).

Still further, when the removal of color and the removal of pattern are designated as the process contents for the sleeve part ((E) of FIG. 10), in Step S203, the control unit 21 may acquire only feature information on the shape of the processed region 60 of the original image 32. Further, in Step S305, the control unit 11 may calculate the degree of similarity between the feature information on the shape of the processed region 60 of the original image 32 and feature information on the shape of the processed region 60 of the comparison target image. Also with this configuration, for example, it is possible to search for a clothing image whose color, pattern, and shape of a trunk part (part other than the sleeve) are identical or similar to those of a trunk part of a clothing image (original image 32) and whose shape of the sleeve part is identical or similar to that of the sleeve part of the clothing image (original image 32).

Note that, because the non-processed region 62 of the processed image 36 and the non-processed region 62 of the original image 32 are identical to each other, in Modified Example [4] described above, feature information on the non-processed region 62 of the processed image 36 is acquired instead of feature information on the non-processed region 62 of the original image 32.

[5] Further, for example, the search unit 56 and the output control unit 58 may be implemented on the user terminal 20. In other words, the user terminal 20 may directly access the database 16. Further, the search condition setting unit 54 may be implemented on the server 10.

[6] Still further, for example, an image stored in the database 16 may be divided into fine blocks, and feature information calculated in advance for each block may be stored in the database 16. Then, in Steps S301 and S304 of FIG. 12, feature information on the comparison target image may be acquired based on the feature information for each block stored in the database 16. Processing load may be reduced in this manner.

[7] While the case where a clothing image is searched for has been exemplified above, the present invention is applicable also to a search for an image other than the clothing image. For example, the present invention is applicable also to a search for a culinary image.

REFERENCE SIGNS LIST

1 image search system, 2 communication network, 10 server, 11,21 control unit, 12, 22 main memory unit, 13, 23 auxiliary storage unit, 14, 24 communication unit, 15 optical disc drive unit, 20 user terminal, 25 display unit, 26 sound output unit, 27 operation unit, 30 process screen, 32 original image, 34 menu, 36 processed image, 40 search result screen, 42A, 42B, 42C, 42D, 42E, 42F, 42G, 42H image, 50 original image acquisition unit, 52 reception unit, 54 search condition setting unit, 56 search unit, 58 output control unit, 60 processed region, 62 non-processed region

The invention claimed is:

1. An image search device, comprising:
an information obtaining unit configured to acquire change image information for a first region of an original image;
a search condition setting unit configured to set a search condition for an image search; and
an output control unit configured to output images resulting from an image search based on the search condition;
wherein said search condition setting unit is configured to set a search condition by using a plurality of different kinds of feature information regarding a second region of the original image or of a processed image, and at least one piece of a plurality of different kinds of feature information regarding the first region of the processed image;
wherein the processed image is an image being obtained by applying the change image information to the first region of the original image;
wherein the second region of said processed image does not contain change image information; and
wherein the at least one piece of the plurality of different kinds of feature information regarding the first region of the processed image is selected based on the change image information for the first region of the original image.

2. The image search device according to claim 1, wherein,
in a case where the original image is included in the images resulting from the image search, the output control unit does not output the original image as one of the images resulting from the image search.

3. The image search device according to claim 1, wherein:
the output control unit comprises:
an output order setting unit configured to set an output order of each of the images resulting from the image search based on a degree of similarity between each of the images resulting from the image search and the original image; and
a unit configured to output the images resulting from the image search in accordance with the output order of each of the images resulting from the image search; and
the output order setting unit sets an output order of an image having a low degree of similarity with the original image to be higher than an output order of an image having a high degree of similarity with the original image.

4. The image search device according to claim 1, further comprising:
a search unit configured to execute the image search based on the search condition, wherein:
the search unit comprises a determination unit configured to determine whether or not a target image is an identical or similar image to the processed image, and search for an image identical or similar to the processed image;
the determination unit comprises:
a unit configured to determine whether or not a first degree of similarity is equal to or higher than a first reference degree of similarity, the first degree of similarity indicating a degree of similarity between the plurality of different kinds of feature information regarding the second region of the processed image or of the original image and a plurality of different kinds of feature information regarding a region of the target image corresponding to the second region of the processed image; and
a unit configured to determine whether or not a second degree of similarity is equal to or higher than a second reference degree of similarity lower than the first reference degree of similarity, the second degree of similarity indicating a degree of similarity between the at least one piece of feature information regarding the first region of the processed image and the at least one piece of feature information regarding a region of the target image corresponding to the first region of the processed image; and
the determination unit determines that the target image is an identical or similar image to the processed image when the first degree of similarity is equal to or higher than the first reference degree of similarity and the second degree of similarity is equal to or higher than the second reference degree of similarity.

5. The image search device according to claim 1, further comprising:
a search unit that executes the image search based on the search condition, wherein:
the search unit comprises a determination unit that determines whether or not a target image is a similar image to the original image, and searches for an image similar to the original image;
the determination unit comprises:

a unit that determines whether or not a first degree of similarity is equal to or higher than a first reference degree of similarity, the first degree of similarity indicating a degree of similarity between the plurality of different kinds of feature information regarding the second region of the original image and a plurality of kinds of feature information on a region of the target image corresponding to the second region of the original image; and a unit that determines whether or not a second degree of similarity is equal to or higher than a second reference degree of similarity lower than the first reference degree of similarity, the second degree of similarity indicating a degree of similarity between at least one piece of feature information on the first region of the original image and at least one piece of feature information on a region of the target image corresponding to the first region of the original image; and the determination unit determines that the target image is a similar image to the original image when the first degree of similarity is equal to or higher than the first reference degree of similarity and the second degree of similarity is equal to or higher than the second reference degree of similarity.

6. An image search method, comprising:

acquiring change image information for a first region of an original image;

setting a search condition for an image search; and outputting images resulting from an image search based on the search condition;

wherein said setting comprises setting a search condition by using a plurality of different kinds of feature information regarding a second region of the original image or of a processed image, and at least one piece of a plurality of different kinds of feature information regarding the first region of the processed image;

wherein the processed image is an image being obtained by applying the change image information to the first region of the original image;

wherein the second region of said processed image does not contain change image information; and wherein the at least one piece of the plurality of different kinds of feature information regarding the first region of the processed image is selected based on the change image information for the first region of the original image.

7. A non-transitory computer readable information storage medium storing a program for causing a computer to:

acquire change image information for a first region of an original image;

set a search condition for an image search; and output images resulting from an image search based on the search condition;

wherein said program causes the computer to set a search condition by using a plurality of different kinds of feature information regarding a second region of the original image or of a processed image, and at least one piece of a plurality of different kinds of feature information regarding the first region of the processed image;

wherein the processed image is an image being obtained by applying the change image information to the first region of the original image;

wherein the second region of said processed image does not contain change image information; and wherein the at least one piece of the plurality of different kinds of feature information regarding the first region of the processed image is selected based on the change image information for the first region of the original image.

* * * * *